United States Patent
Distelhoff et al.

(10) Patent No.: US 6,250,328 B1
(45) Date of Patent: Jun. 26, 2001

(54) DEVICE FOR SUPPLYING AN INTERNAL COMBUSTION ENGINE OF A MOTOR VEHICLE WITH FUEL

(75) Inventors: Markus Distelhoff; Karl Eck, both of Frankfurt; Winfried Fröhlich, Bad Camberg; Dieter Keller, Aschaffenburg; Justus Klöker, Neu-Anspach; Knut Meyer, Essen; Ingo Mohr, Höhn; Bernd Rumpf, Nidderau-Windecken; Wolfgang Sinz, Sulzbach, all of (DE)

(73) Assignee: Mannesmann Vdo AG (DE)

( * ) Notice: Subject to any disclaimer, the term of this patent is extended or adjusted under 35 U.S.C. 154(b) by 0 days.

(21) Appl. No.: 09/531,060

(22) Filed: Mar. 20, 2000

(30) Foreign Application Priority Data

Apr. 13, 1999 (DE) .............................. 199 16 530

(51) Int. Cl.$^7$ ................................ F16K 49/00
(52) U.S. Cl. .................. 137/338; 123/541; 123/41.31
(58) Field of Search ..................... 123/514, 541, 123/41.31; 137/338

(56) References Cited

U.S. PATENT DOCUMENTS 4,072,138 * 2/1978 Hawkins et al. ............... 123/552
4,285,316    8/1981 Stolz et al. ..................... 123/514
4,411,239 * 10/1983 Kelch ............................. 123/557
4,784,104 * 11/1988 Dimond ......................... 123/514
4,872,438 * 10/1989 Ausiello et al. ................ 123/514
4,924,838 *  5/1990 McCandless ................... 123/541
5,005,551 *  4/1991 McNelley ....................... 123/557
5,259,356    11/1993 Karlsson et al. ............... 123/541
5,368,003 * 11/1994 Clemente ....................... 123/541
5,584,279 * 12/1996 Brunnhofer .................... 123/541

FOREIGN PATENT DOCUMENTS

19619934A1   11/1997  (DE) .
 0826874A2    3/1998  (DE) .
19734496C1    9/1998  (DE) .

* cited by examiner

Primary Examiner—A. Michael Chambers
Assistant Examiner—Thomas L. McShane
(74) Attorney, Agent, or Firm—Richard A. Speer; Mayor Brown & Platt

(57) ABSTRACT

A device for supplying an internal combustion engine (1) of a motor vehicle with fuel has a return line (4) which is passed into a fuel tank (2) and has a wall made of a material of high thermal conductivity. The return line (4) is arranged within a ventilation duct (5). Cooling air is conveyed through the ventilation duct (5) to the return line (4). This is a simple means of limiting the maximum temperature of the fuel in the fuel tank (2).

9 Claims, 2 Drawing Sheets

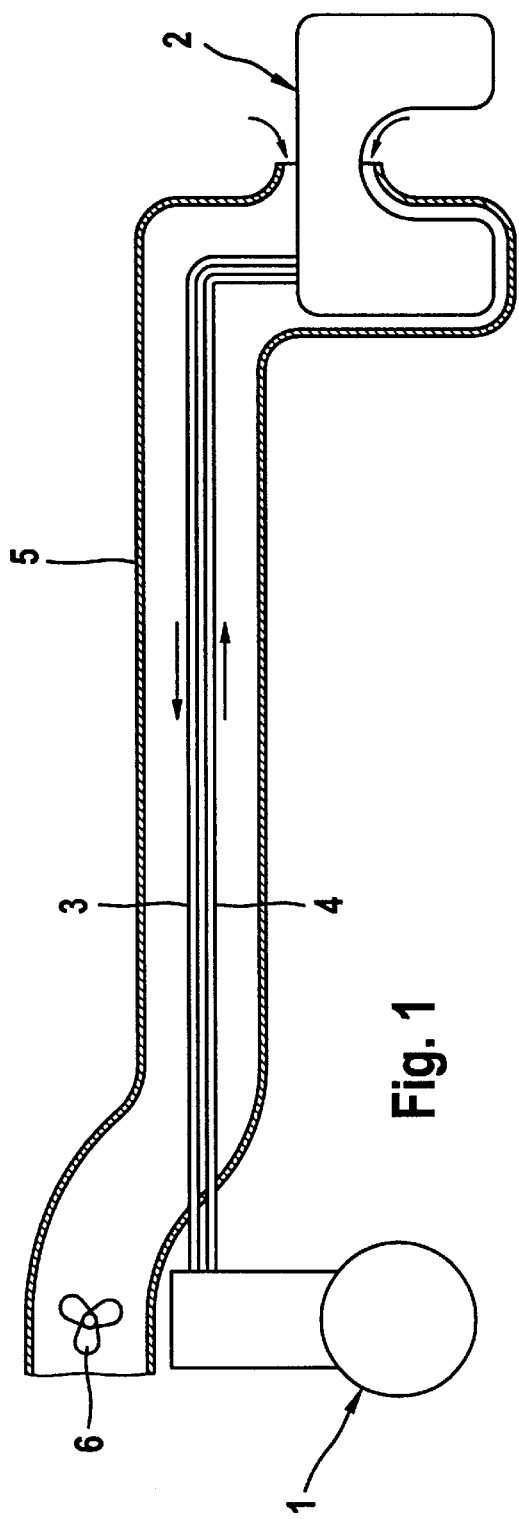
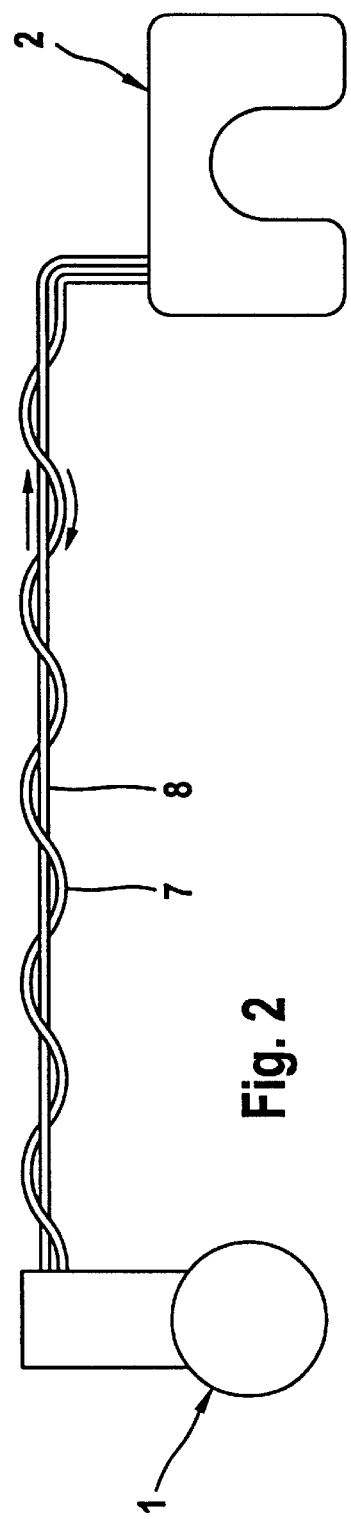

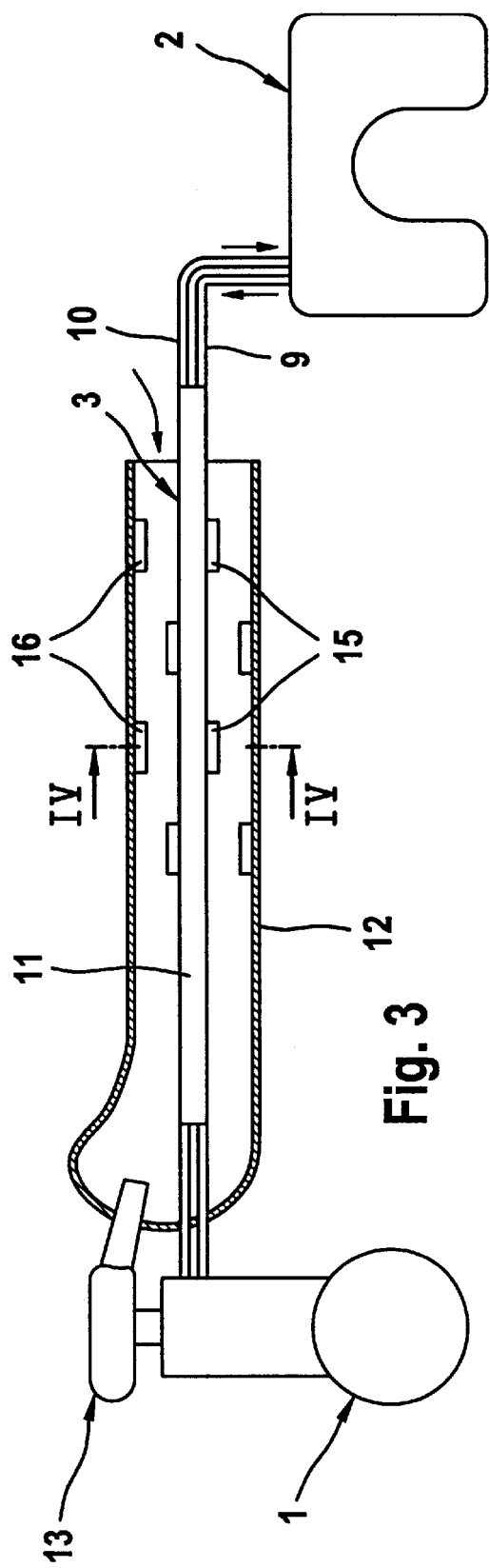
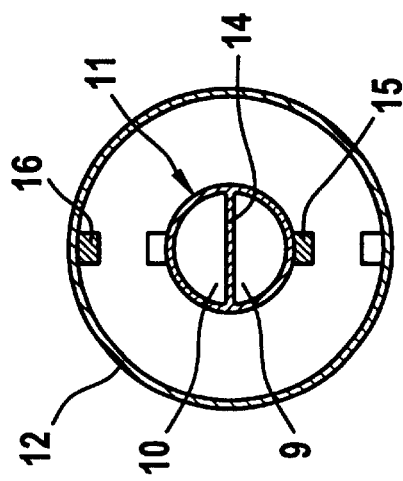
Fig. 3
Fig. 4

DEVICE FOR SUPPLYING AN INTERNAL COMBUSTION ENGINE OF A MOTOR VEHICLE WITH FUEL

BACKGROUND OF THE INVENTION

The invention relates to a device for supplying an internal combustion engine of a motor vehicle with fuel having a feed line which leads from a fuel tank to the internal combustion engine and having a return line for the purpose of returning the fuel to the fuel tank and having a cooling device for cooling the fuel fed back into the fuel tank.

Such devices are often used in today's motor vehicles with diesel internal combustion engines and are known in practice. Here, the cooling device has a radiator which is mounted in the return line and is exposed to the relative wind of the motor vehicle. Cooling the fuel serves to keep the temperature in the fuel tank below an envisaged value. The maximum temperature which should not be exceeded in the fuel tank depends essentially on the material of the fuel tank and, in current plastic fuel tanks, is about 70° C. Cooling of the fuel in the return line is necessary in the case of systems for internal combustion engines referred to as common-rail systems, for example, because here the fuel fed back via the return line is heated particularly strongly by the internal combustion engine.

The disadvantage with the known device is that the radiator, which has to be mounted in the relative wind, makes it very complex in construction and costly to manufacture.

The problem underlying the invention is to configure a device of the type stated at the outset in such a way that its construction is as simple as possible in terms of design and it can be produced at a reasonable cost.

BRIEF DESCRIPTION OF THE INVENTION

According to the invention, this problem is solved by the fact that the return line is manufactured from a material of high thermal conductivity and the cooling device has means for guiding a cooling medium along at least a subsection of the return line.

By virtue of this configuration, the fuel can release heat via the wall of the return line. As a result, there is no need for the involved process of mounting components in the return line to cool the fuel. The device according to the invention is therefore of particularly simple construction and can be produced at reasonable cost. Since the temperature of the fuel within the return line differs greatly from the surroundings, ambient air of the motor vehicle is generally sufficient as the cooling medium.

As in the known device, the medium which cools the fuel in the return line could be the relative wind of the motor vehicle, for example. However, this does not ensure adequate cooling of the fuel, particularly when the motor vehicle is traveling uphill or in congested traffic. According to an advantageous development of the invention, the fuel in the return line can be cooled reliably to an envisaged temperature level if the cooling device has a fan, which conveys the air along the return line, or an intake unit for combustion air. The cooling of the return line with combustion air drawn in by the internal combustion engine furthermore has the advantage that fuel which escapes due to leaks or permeation from the device according to the invention is fed to the internal combustion engine.

According to another advantageous development of the invention, the fuel conveyed in the return line is cooled in a particularly intensive manner if the cooling device has a ventilation duct for accommodating the return line and for guiding the cooling air along the return line.

According to another advantageous development of the invention, the cooling device does not require the additional installation of a fan if the ventilation duct is continued as far as an intake side of a cooling fan of a liquid cooling system of the internal combustion engine.

The device according to the invention can be installed in a particularly simple manner in the motor vehicle if the feed line is arranged within the ventilation duct. This makes it possible to connect the feed line and the return line to one another first and then to secure them together in the ventilation duct. Since the fuel conveyed in the feed line is at a lower temperature than that in the return line, this configuration cannot contribute to unnecessary heating of the fuel fed back into the fuel tank.

According to another advantageous development of the invention, it is a simple matter to keep the fuel tank at an envisaged temperature level if the ventilation duct encloses at least a partial region of the fuel tank with a clearance. It is sufficient here if the bottom region of the fuel tank is enclosed since, particularly when the fuel tank is almost empty, the fuel fed back by the return line has a great effect on the temperature in the fuel tank.

According to another advantageous development of the invention, the return line has a particularly large heat-emitting surface if cooling elements are arranged on the return line.

According to another advantageous development of the invention, guide elements for guiding cooling air onto the return line contribute to a further improvement in heat transfer from the return line to the cooling medium.

The design configuration of the device according to the invention is particularly simple if the feed line is manufactured from a material of high thermal conductivity, and if the return line and the feed line rest against one another. Since the fuel in the return line is at a higher temperature and has a smaller volume flow than that in the feed line, it is cooled in a particularly reliable manner as a result. This configuration can keep the temperature in the fuel tank low either alone or together with the cooling air guided along the return line. A further advantage of this configuration consists in that the internal combustion engine receives preheated fuel in the case of a cold start.

According to another advantageous development of the invention, the installation of the feed line and the return line in the motor vehicle is particularly simple if the feed line and the return line have a subsection with a common partition wall of high thermal conductivity.

The device according to the invention requires a particularly low outlay on construction if the return line and the feed line are intertwined.

BRIEF DESCRIPTION OF THE DRAWINGS

The invention allows numerous embodiments. To further clarify its basic principle, a number of these are illustrated in the drawing and described below. In the drawing:

FIG. 1 shows a schematic representation of a device according to the invention with a ventilation duct, FIG. 2 shows schematically another embodiment of the device according to the invention, FIG. 3 shows another embodiment of the device according to the invention in schematic representation, and FIG. 4 shows a sectional view through a common subsection of the feed and return line of FIG. 3 along the line IV—IV.

DETAILED DESCRIPTION OF THE INVENTION

FIG. 1 shows schematically a motor-vehicle internal combustion engine 1 designed as a diesel engine and a fuel tank 2 configured as a saddle tank. The internal combustion engine 1 is supplied with fuel from the fuel tank 2 via a feed line 3. Excess fuel, which is heated up very greatly by the internal combustion engine 1, is fed back into the fuel tank 2 via a return line 4. Together the feed and return lines 3 and 4, respectively, define a fuel flow directing conduit which extends the entire length or distance between fuel tank 2 and 1. As shown in the drawings and as pointed out more specifically hereinafter, the lines 3 and 4 are in intimate, physical contact along their entire lengths between tank 2 and engine 1. The feed line 3 and the return line 4 are arranged in a common ventilation duct 5 extending from the internal combustion engine 1 to the fuel tank 2. A fan 6 is arranged at that end of the ventilation duct 5 which is near the internal combustion engine 1. The fan 6 draws in air through the ventilation duct 5. For clarity, directions of flow of air and fuel are indicated by arrows in the drawing. The return line 4 is manufactured from a material with a good thermal conductivity. The hot fuel flowing in the return line 4 releases a large part of its heat to the air flowing in the ventilation duct 5. By means of appropriate configuration of the return line 4, the fan 6 and the ventilation duct 5, it is possible to keep the temperature of the fuel fed back into the fuel tank 2 reliably below an envisaged value of, for example, 70° C.

The fan 6 can be a separate fan or a fan for a liquid cooling system (not shown) of the internal combustion engine 1. Only that region of the fuel tank 2 which opens into the return line 4 is arranged in the ventilation duct 5. This region is heated particularly strongly by the fuel fed back from the internal combustion engine 1. Conveying the air from the fuel tank 2 to the internal combustion engine 1 and hence against the direction of flow of the fuel in the return line 4 ensures very high heat transfer from the fuel flowing in the return line 4 to the air. The fan 6 could, of course, also convey air into the ventilation duct 5. As a result, a pressure which stabilizes the ventilation duct 5 builds up in the latter.

FIG. 2 shows schematically another embodiment of the device according to the invention, in which a feed line 7 and a return line 8 are intertwined. The feed line 7 and the return line 8 are manufactured from a material of good thermal conductivity. Since a larger volume flow is conveyed at a lower temperature in the feed line 7 than in the return line 8, heat can be transferred easily from the return line 8 to the feed line 7. The feed line 7 and the return line 8 thus form a countercurrent heat exchanger.

FIG. 3 shows schematically another embodiment of the device according to the invention, in which a feed line 9 and a return line 10 have a common subsection 11. The feed line 9 and the return line 10 are furthermore arranged in a common ventilation duct 12. One end of the ventilation duct 12 is connected to an intake unit 13 of the internal combustion engine 1. Cooling elements 15 are arranged on the common subsection 11. On its inside, the ventilation duct 12 bears guide elements 16 to guide the air.

FIG. 4 shows, on a greatly enlarged scale, the common subsection 11 of the feed line 9 and the return line 10, the said subsection being arranged in the ventilation duct 12. It can be seen here that a partition wall 14 is arranged between the feed line 9 and the return line 10. The partition wall 14 is manufactured from a material with a high thermal conductivity, thus allowing heat to be transferred from the return line 10 to the feed line 9 and to the air flowing in the ventilation duct 12.

What is claimed is:

1. A motor vehicle fuel system for conducting and thermally conditioning fuel flowing between a fuel tank and an internal combustion engine comprising:
    (1) a fuel flow directing conduit consisting of, (a) a fuel feed line extending from the fuel tank to the vehicle engine and (b), a fuel return line extending from the vehicle engine to the fuel tank, wherein the feed line and the return line are in physical contact throughout the entire length of the flow conduit located between the fuel tank and the vehicle engine to effect thermal transfer between fuel in the feed and return lines;
    (2) A cooling device including means for guiding cooling air along at least part of the length of the fuel flow conduit located between the fuel tank and the vehicle engine; and
    (3) means for creating an airflow through the cooling device guiding means.

2. The fuel system as defined in claim 1 wherein the means for creating an air flow is a fan (6).

3. The fuel system as defined in claim 1 or 2 wherein the means for guiding cooling air along the fuel flow conduit is a ventilation duct (5, 12).

4. The fuel system as defined in claim 3, wherein the ventilation duct (5, 12) is continued as far as an intake side of a cooling fan of a liquid cooling system of the internal combustion engine (1).

5. The fuel system as claimed defined in claim 3, wherein the ventilation duct (3) encloses at least a partial region of the fuel tank (2) with a clearance.

6. The fuel system as defined in claim 1, wherein cooling elements (15) are arranged on the return line (10).

7. The fuel system as defined in claim 1 wherein guide elements 16 are provided on an inner surface of the cooling air guiding means for guiding cooling air onto the return line 10.

8. The fuel system as defined in claim 1, wherein the feed line (9) and the return line (10) have a subsection (11) with a common partition wall (14) of high thermal conductivity.

9. The fuel system as defined in claim 1, wherein the return line (8) and the feed line (7) are intertwined.

* * * * *